Patented Aug. 18, 1942

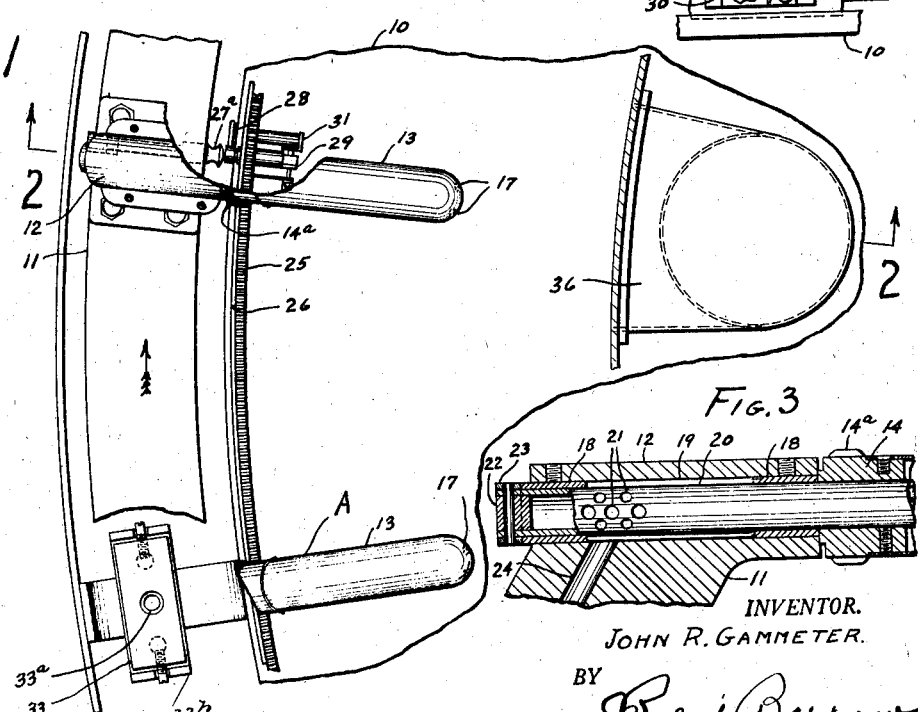

2,293,290

UNITED STATES PATENT OFFICE 2,293,290

ARTICLE CONVEYING AND SORTING APPARATUS

John R. Gammeter, Akron, Ohio

Application April 27, 1940, Serial No. 332,009

6 Claims. (Cl. 214—1)

This invention relates to article conveying and sorting apparatus, as for example, for use with mechanisms for testing, branding and sorting thin rubber articles after manufacture thereof and prior to shipment, the particular embodiment of the invention relating to the forms on which the articles are mounted, and automatic means for discharging the articles from the forms after they have been tested for defects.

A purpose of the invention is to provide apparatus of the character described having improved means for rotatably mounting the forms on the conveyor, and improved means for discharging the articles from the forms, the arrangement being such that dust or the like, such as soapstone dust used in the manufacture of thin rubber goods, is prevented from entering the bearing joints of the forms, and thereby jamming the mechanism or reducing the efficiency thereof.

Another purpose of the invention is to provide mechanism of the character described which is self-operating to remove dust, grit or the like which might accumulate within the forms and the passages of the article-discharging device.

These and other objects of the invention will be manifest from the following brief description and the accompanying drawing.

This present invention embodies improvements on the apparatus shown and described in copending application, Serial No. 226,112, filed August 22, 1938, now Patent 2,221,323.

Of the accompanying drawing:

Figure 1 is a plan view, partly broken away, of the apparatus embodying the invention.

Figure 2 is a cross-section taken substantially on line 2—2 of Figure 1.

Figure 3 is an enlarged cross-section, partly broken away, of a portion of the form-mounting shown in Figure 2.

Figure 4 is a cross-section taken on line 4—4 of Figure 2.

Figure 5 is a cross-section taken on line 5—5 of Figure 2.

Referring to the drawing, the numeral 10 designates a relatively fixed table, and the numeral 11 designates an annulus or conveyor which is rotatable about the table 10. The details of construction of table 10 and annulus 11, including the means for supporting the table in relatively fixed relation and means for rotating the annulus about the table, are substantially as shown and described in copending application, Serial No. 226,112, filed August 22, 1938, said application covering apparatus for testing, sorting and branding hollow rubber articles, such as prophylactics, finger cots, or the like.

The annulus 11 carries thereon a circumferential series of equally spaced mountings 12 for rotatably supporting forms 13 in upwardly inclined relation, these forms having articles A received thereon in distended unwrinkled condition as they approach the article-discharging means, such articles having been previously placed on the forms at an article-applying station (not shown).

For certain of the forementioned operations on the finished article A, the forms 13 must necessarily be rotated, as for example, when passing through testing and branding devices (not shown). Each form 13 may comprise a hollow shell of electroconductive material. Secured at an open end of the shell may be a sleeve or spacer 14 for non-rotatably receiving a hollow stem 15, which extends inwardly of the forms to adjacent an outer closed end thereof, the inner end of the stem being supported in spaced relation to the inner surface of the shell by a sleeve or spacer 16. The sleeves 14 and 16 tightly seal the space between the same to prevent passage of dust, such as soapstone dust, used in the manufacture of thin rubber articles, and which may settle about the apparatus. One or more openings 17 are provided in the closed end of the form 13 to communicate with the interior of stem 15, for introducing air between the form and the article to discharge the article from the form, as will be subsequently described. The stem 15 may extend outwardly of the forms to be journalled in a pair of spaced oilless bushings 18, 18, secured in a bore 19, in mounting 12, the space between the bearings 18 defining a sealed annular chamber 20 in mounting 12, which chamber communicates with the interior of stem 15 through a series of apertures 21 in the stem, in all rotated positions of the stem. The lower end of stem 15 is closed by means of a plug 22. Form 13 is retained on the mounting 12 by means of the sleeve 14 engaging one face of the mounting 12, and a collar 23 secured to the lower end of stem 15 engaging the end of lower bushing 18 projecting from the opposite face of mounting 12.

At certain stations around the table 10, in the path of the conveyor or annulus 11, may be provided means for automatically supplying air to the chamber 20 through a passage 24 in the mounting 12. From the chamber 20, the air will pass through the openings 21 in all rotated positions of the form and thence through the stem and the openings 17 in the form, to be introduced between the form and the article thereon for discharging the article from the form. This article-discharging operation may be for the purpose of discarding articles found to be defective by the article-testing mechanism, disclosed in said copending application, or the articles may be discharged as perfect goods at another station for packaging and shipment.

For the purpose of discharging or discarding articles from the form, the forms need not be rotated. They are, however, required to be rotatable for certain other operations, either prior to or subsequent to the discharging or discarding operations. To this end, the sleeve 14 may have a pinion 14ª thereon for engaging with a rack 25 mounted on an annular plate 26, secured to table 10. Movement of the annulus 11 will translate the pinion 14ª along the rack 25 to cause rotation of the forms.

As disclosed in the above referred to copending application, certain of the forms may have defective articles A thereon, the presence of such defective articles being manifested by means of an electrically operated testing device (not shown), this testing device causing a plunger 27, shiftably mounted in mounting 12 of the form carrying the defective article, to be shifted inwardly of the annulus 11, as indicated in chain-dotted lines in Figure 2. A head 27ª on the plunger is thus moved inwardly for engagement with a pivoted lever 28 upon continued movement of the annulus 11, thereby to swing a lever 29 upwardly against the yielding action of a spring 30 to actuate a micro-switch 31, which will close an electrical circuit through an electrically operated valve 32. The lever 28 is held in raised position by the moving head 27a while the passage 24 in mounting 12 is momentarily in communication with an opening or recess 33ª of a block 33, which block is yieldingly supported on a bracket 33ᵇ to be in sliding engagement with the under side of the annulus (see Figure 4). During this momentary operation of lever 28 a valve 32 is actuated to blow a blast of air through a conduit 34 connected to block 33, and thence through opening 33ª, passage 24, chamber 20, stem 15 and openings 17, thereby to discharge the defective article A from the form and into a suitable receptacle 36 mounted on table 10.

In the operation of the apparatus, the annulus or conveyor 11 is mounted about table 10, progressively to carry the forms 13 having articles A thereon into association with the article-discharging mechanism, as shown in Figure 2. The presence of defective goods on a form will be manifested by the testing device (not shown), by causing the plunger 27 to be shifted to project head 27ª thereof inwardly for engagement with lever 28, which engagement will actuate the micro-switch 31 to energize the electrically operated valve 32 for a brief interval, while the form is passing the receptacle 36. During this interval, air supplied through conduit 34 is blown through the stem 15 and openings 17, as described above, to discharge the defective article from the form into the receptacle 36. Similar mechanism may be utilized to discharge perfect goods from the forms at another station (not shown). In such case, the plunger 27 may be actuated as desired, by suitable cam means (not shown) arranged in the path of the plunger.

Thus it will be seen that with the present construction dust, such as soapstone dust used in the manufacture of dipped hollow rubber articles, upon entering the form through the openings 17 cannot readily reach the bearing surfaces between the bushings 18 and the stem 15, there being no bearing surfaces within the form 13 itself. Any such dust which may pass down through the stem will be blown outwardly through the openings 17 in the forms when the valve 32 is operated. It will also be readily seen that the article-discharging mechanism is effectively operable in all rotated positions of the form, whether the same is stationary, or being rotated by engagement of the pinion 14ª with rack 25.

Modifications of the invention may be resorted to without departing from the spirit thereof or the scope of the appended claims.

What is claimed is:

1. In article sorting apparatus of the character described, a mounting, said mounting having spaced annular bearing elements, a form journalled in said bearings to rotate about a longitudinal axis of the form and adapted to receive hollow articles thereon, means for rotating said form while an operation is performed upon an article received thereon, said form and mounting defining an annular chamber between said bearing elements, said form having a passage therein communicating at one end with said chamber in all rotated positions of the form and having an opening or openings communicating with said passage for introducing air between the form and an article thereon, and means for applying air under pressure to said chamber to discharge articles from the form while it is either rotating or stationary with respect to said mounting.

2. In article sorting apparatus of the character described, a hollow form for receiving a hollow article thereon, a hollow stem non-rotatably mounted in said form to extend longitudinally from one end thereof, means for substantially sealing the space between said stem and the inner surfaces of said form against passage of foreign matter, a mounting for rotatably receiving said stem extension, means adapted to rotate said form while an operation is performed upon an article received thereon, said stem being closed at the extension end thereof and open at the other end, said mounting having a chamber therein, said stem being apertured at said extension end to communicate the interior thereof with said chamber in all rotated positions of said form, said form having an opening or openings communicating with said open end of said stem for introducing air between the form and an article thereon, and means for supplying air under pressure to said chamber to discharge an article from the form while it is either rotating or stationary with respect to said mounting.

3. In article conveying and sorting apparatus of the character described, a conveyor, a series of chambered mountings carried by said conveyor, forms journalled in said mountings to rotate about the longitudinal axis thereof and adapted to receive hollow articles thereon, means for rotating said forms while operations are performed upon articles received thereon, each of said forms having a passage communicating at one end with the chamber of its respective mounting in all rotated positions of the form and having an opening or openings adjacent the other end thereof communicating with said passage for introducing air between the form and an article thereon, and relatively fixed means for supplying air under pressure to said chambers as the conveyor carries said mountings into association therewith, thereby to supply air through said passages and said opening or openings in the forms to discharge articles from the forms while they are either rotating or stationary with respect to the mountings thereof.

4. In article conveying and sorting apparatus of the character described, a conveyor, a series of chambered mountings carried by said conveyor, forms journalled in said mountings to rotate about the longitudinal axis thereof and adapted to receive hollow articles thereon, means for rotating said forms while operations are performed upon articles received thereon, each of said forms having a passage communicating at one end with the chamber of its respective mounting in all rotated positions of the form and having an opening or openings adjacent the other end thereof communicating with said passage for introducing air between the form and an article thereon, relatively fixed means for supplying air under pressure to said chambers as the conveyor carries said mountings into association therewith, thereby to supply air through said passages and said opening or openings in the forms to discharge articles from the forms while they are either rotating or stationary with respect to the mountings thereof, and means operable by movement of said conveyor for actuating said last named means when in association with one of said mountings.

5. In article sorting apparatus of the character described, a mounting having a chamber therein, a form having an extension journalled in said mounting to rotate about a longitudinal axis of the form, said form extending freely from said mounting for receiving a hollow article thereon, means for rotating said form while an operation is performed upon an article received thereon, said form and extension having a passage communicating with said chamber in all rotated positions of said form, said form having an opening or openings adjacent the outer end thereof communicating with said passage, and means for supplying fluid pressure to said chamber, whereby pressure may be applied through said passage and said opening or openings to discharge articles from the form while it is either rotating or stationary with respect to said mounting.

6. In article sorting apparatus of the character described, a mounting having a chamber therein, a form journalled in said mounting to rotate about a longitudinal axis thereof and extending freely of the mounting for receiving hollow articles thereon, means for rotating said form while an operation is performed upon an article received thereon, said form having a passage communicating with said chamber in all rotated positions of the form and having an opening or openings communicating with said passage for introducing air between the form and an article thereon, and means for supplying air under pressure to said chamber to discharge articles from the form while it is either rotating or stationary with respect to said mounting.

JOHN R. GAMMETER.